US012608895B2

(12) United States Patent
Madden

(10) Patent No.: US 12,608,895 B2
(45) Date of Patent: Apr. 21, 2026

(54) ENHANCING MONITORING SYSTEM WITH AUGMENTED REALITY

(71) Applicant: ObjectVideo Labs, LLC, Tysons, VA (US)

(72) Inventor: Donald Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 18/631,809

(22) Filed: Apr. 10, 2024

(65) Prior Publication Data

US 2024/0257483 A1 Aug. 1, 2024

Related U.S. Application Data

(63) Continuation of application No. 17/496,041, filed on Oct. 7, 2021, now Pat. No. 11,983,827, which is a continuation of application No. 17/019,861, filed on Sep. 14, 2020, now Pat. No. 11,164,389, which is a continuation of application No. 16/057,890, filed on Aug. 8, 2018, now Pat. No. 10,803,667.

(60) Provisional application No. 62/544,084, filed on Aug. 11, 2017.

(51) Int. Cl.
| | |
|---|---|
| *G06T 19/00* | (2011.01) |
| *G06V 20/20* | (2022.01) |
| *G06V 20/52* | (2022.01) |

(52) U.S. Cl.
CPC ............ *G06T 19/006* (2013.01); *G06V 20/20* (2022.01); *G06V 20/52* (2022.01); *G06T 2219/004* (2013.01)

(58) Field of Classification Search
CPC . G06T 19/006; G06T 2219/004; G06V 20/20; G06V 20/52
See application file for complete search history.

(56) References Cited

U.S. PATENT DOCUMENTS

| | | | |
|---|---|---|---|
| 6,970,183 | B1 | 11/2005 | Monroe |
| 9,064,394 | B1 | 6/2015 | Trundle |
| 9,665,778 | B1 | 5/2017 | Trundle |
| 10,339,388 | B1 | 7/2019 | Trundle |
| 10,803,667 | B1 | 10/2020 | Madden |
| 10,841,537 | B2 | 11/2020 | Valli et al. |
| 10,915,758 | B1 | 2/2021 | Trundle |
| 11,164,389 | B2 | 11/2021 | Madden |
| 11,354,908 | B2 | 6/2022 | Trundle |
| 2005/0111696 | A1 | 5/2005 | Baer |
| 2007/0024707 | A1 | 2/2007 | Brodsky |
| 2007/0262857 | A1 | 11/2007 | Jackson |

(Continued)

FOREIGN PATENT DOCUMENTS

| | | |
|---|---|---|
| CN | 204272295 | 4/2015 |

*Primary Examiner* — Michelle Chin
(74) *Attorney, Agent, or Firm* — Fish & Richardson P.C.

(57) ABSTRACT

A computer-implemented method includes obtaining an image of an area of a property from an augmented reality device, identifying the area of the property based on the image obtained from the augmented reality device, determining that the area of the property corresponds to an event at the property or a configuration of a monitoring system of the property, and providing, in response to determining that the area of the property corresponds to the event or the configuration, information that represents the event or the configuration and that is configured to be displayed on the augmented reality device.

20 Claims, 6 Drawing Sheets

(56) References Cited

U.S. PATENT DOCUMENTS

| | | |
|---|---|---|
| 2008/0136910 A1 | 6/2008 | Berkey et al. |
| 2009/0244070 A1 | 10/2009 | Mattikalli et al. |
| 2009/0249387 A1 | 10/2009 | Magdy et al. |
| 2011/0043689 A1 | 2/2011 | Cobb et al. |
| 2011/0188760 A1 | 8/2011 | Wright et al. |
| 2012/0113145 A1 | 5/2012 | Adhikari et al. |
| 2014/0247283 A1 | 9/2014 | Jo |
| 2015/0187138 A1* | 7/2015 | Mullins .................. G06V 20/20 |
| | | 345/633 |
| 2016/0180468 A1 | 6/2016 | Buss et al. |
| 2016/0210790 A1* | 7/2016 | Rasane ................... G06Q 10/06 |
| 2017/0049007 A1 | 2/2017 | Wei et al. |
| 2017/0270362 A1 | 9/2017 | Barnehama et al. |
| 2017/0334559 A1 | 11/2017 | Bouffard et al. |
| 2018/0129276 A1 | 5/2018 | Nguyen et al. |
| 2018/0143756 A1* | 5/2018 | Mildrew ................. G06F 3/013 |
| 2018/0150698 A1 | 5/2018 | Guttnnann et al. |
| 2018/0190017 A1 | 7/2018 | Mendez et al. |
| 2018/0276872 A1* | 9/2018 | Case ................... G06F 16/9038 |
| 2019/0051051 A1 | 2/2019 | Kaufman et al. |
| 2020/0410771 A1 | 12/2020 | Madden |
| 2021/0158054 A1 | 5/2021 | Trundle |
| 2022/0028176 A1 | 1/2022 | Madden |
| 2022/0284708 A1 | 9/2022 | Trundle |

* cited by examiner

200

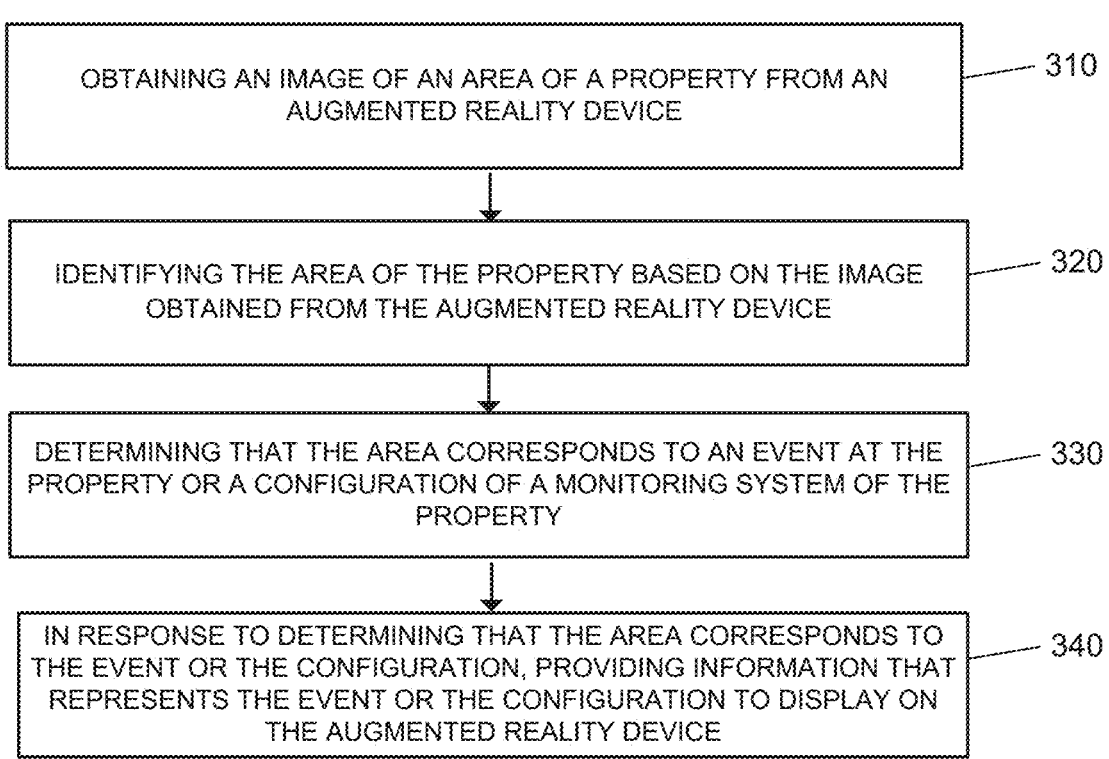

300

| OBTAINING AN IMAGE OF AN AREA OF A PROPERTY FROM AN AUGMENTED REALITY DEVICE | — 310 |

| IDENTIFYING THE AREA OF THE PROPERTY BASED ON THE IMAGE OBTAINED FROM THE AUGMENTED REALITY DEVICE | — 320 |

| DETERMINING THAT THE AREA CORRESPONDS TO AN EVENT AT THE PROPERTY OR A CONFIGURATION OF A MONITORING SYSTEM OF THE PROPERTY | — 330 |

| IN RESPONSE TO DETERMINING THAT THE AREA CORRESPONDS TO THE EVENT OR THE CONFIGURATION, PROVIDING INFORMATION THAT REPRESENTS THE EVENT OR THE CONFIGURATION TO DISPLAY ON THE AUGMENTED REALITY DEVICE | — 340 |

FIG. 3

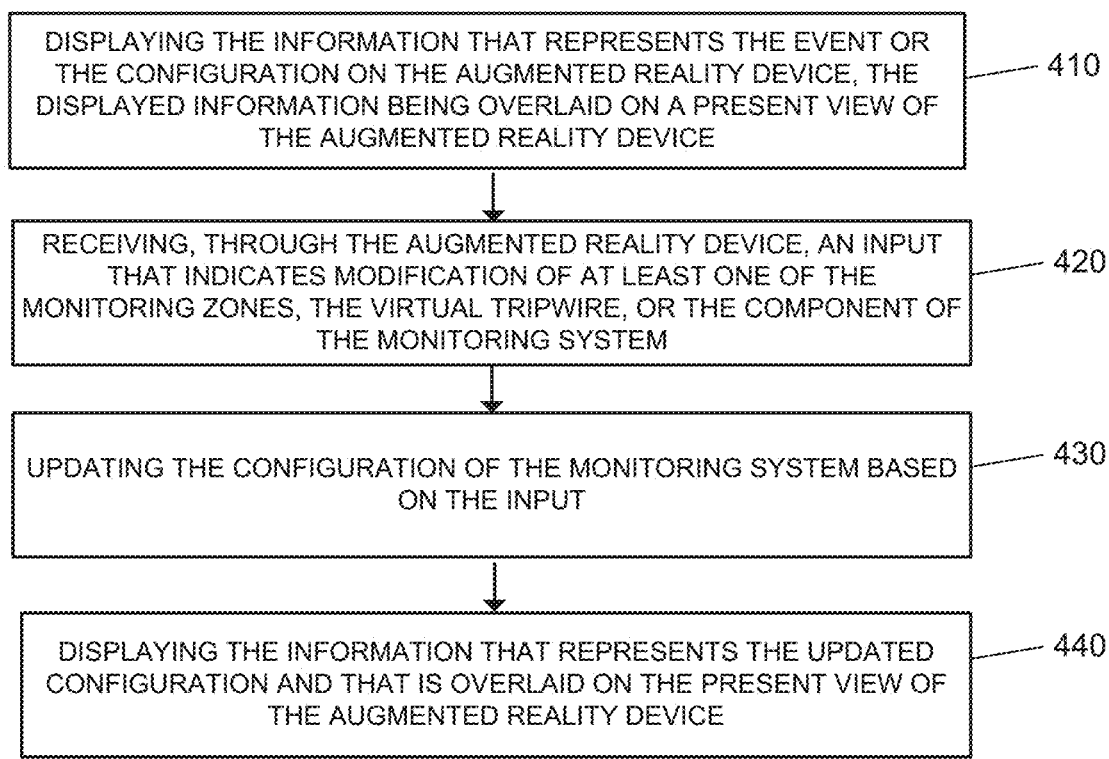

400

DISPLAYING THE INFORMATION THAT REPRESENTS THE EVENT OR THE CONFIGURATION ON THE AUGMENTED REALITY DEVICE, THE DISPLAYED INFORMATION BEING OVERLAID ON A PRESENT VIEW OF THE AUGMENTED REALITY DEVICE — 410

RECEIVING, THROUGH THE AUGMENTED REALITY DEVICE, AN INPUT THAT INDICATES MODIFICATION OF AT LEAST ONE OF THE MONITORING ZONES, THE VIRTUAL TRIPWIRE, OR THE COMPONENT OF THE MONITORING SYSTEM — 420

UPDATING THE CONFIGURATION OF THE MONITORING SYSTEM BASED ON THE INPUT — 430

DISPLAYING THE INFORMATION THAT REPRESENTS THE UPDATED CONFIGURATION AND THAT IS OVERLAID ON THE PRESENT VIEW OF THE AUGMENTED REALITY DEVICE — 440

FIG. 4

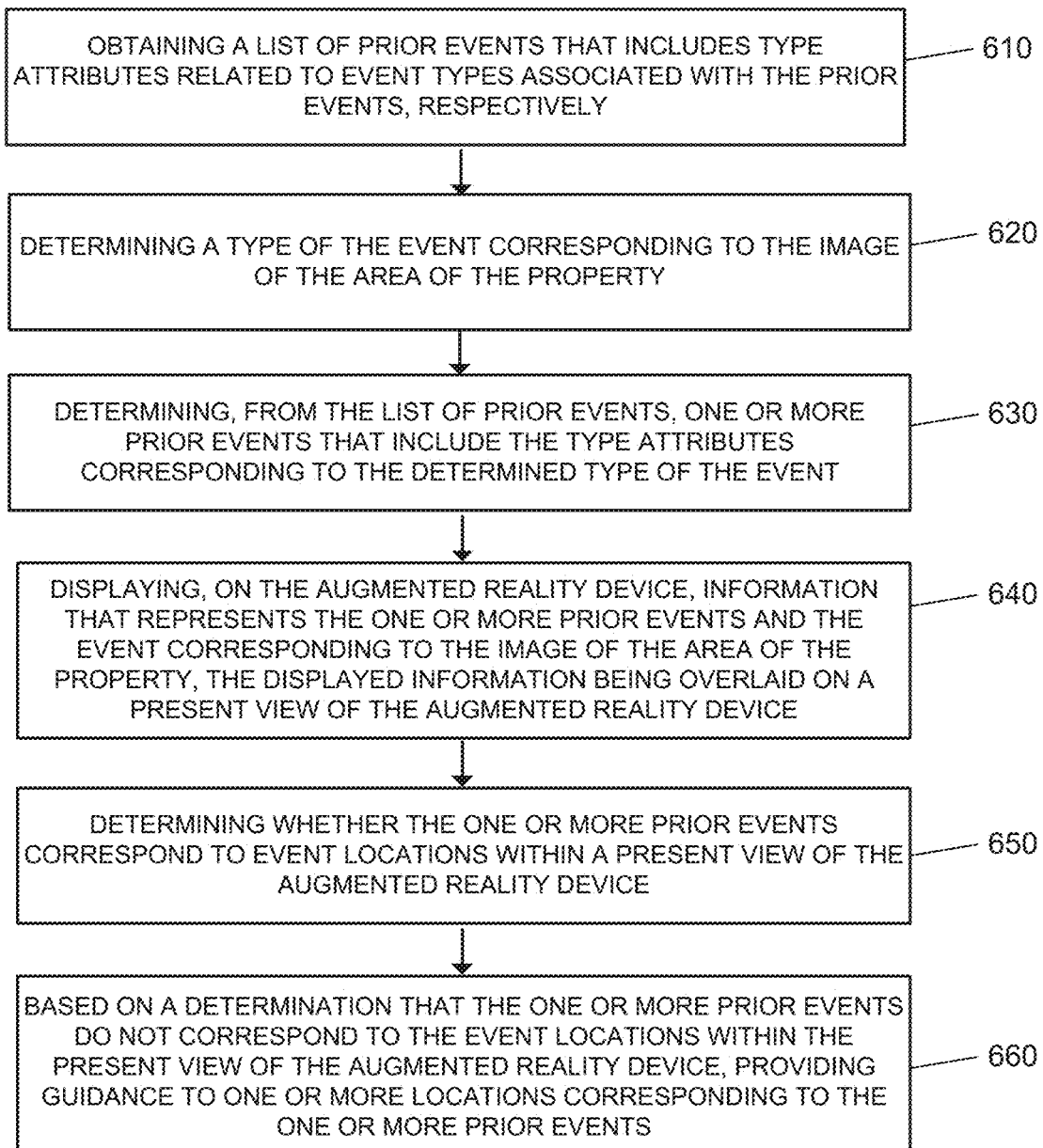

600

OBTAINING A LIST OF PRIOR EVENTS THAT INCLUDES TYPE ATTRIBUTES RELATED TO EVENT TYPES ASSOCIATED WITH THE PRIOR EVENTS, RESPECTIVELY — 610

DETERMINING A TYPE OF THE EVENT CORRESPONDING TO THE IMAGE OF THE AREA OF THE PROPERTY — 620

DETERMINING, FROM THE LIST OF PRIOR EVENTS, ONE OR MORE PRIOR EVENTS THAT INCLUDE THE TYPE ATTRIBUTES CORRESPONDING TO THE DETERMINED TYPE OF THE EVENT — 630

DISPLAYING, ON THE AUGMENTED REALITY DEVICE, INFORMATION THAT REPRESENTS THE ONE OR MORE PRIOR EVENTS AND THE EVENT CORRESPONDING TO THE IMAGE OF THE AREA OF THE PROPERTY, THE DISPLAYED INFORMATION BEING OVERLAID ON A PRESENT VIEW OF THE AUGMENTED REALITY DEVICE — 640

DETERMINING WHETHER THE ONE OR MORE PRIOR EVENTS CORRESPOND TO EVENT LOCATIONS WITHIN A PRESENT VIEW OF THE AUGMENTED REALITY DEVICE — 650

BASED ON A DETERMINATION THAT THE ONE OR MORE PRIOR EVENTS DO NOT CORRESPOND TO THE EVENT LOCATIONS WITHIN THE PRESENT VIEW OF THE AUGMENTED REALITY DEVICE, PROVIDING GUIDANCE TO ONE OR MORE LOCATIONS CORRESPONDING TO THE ONE OR MORE PRIOR EVENTS — 660

FIG. 6

ENHANCING MONITORING SYSTEM WITH AUGMENTED REALITY

CROSS REFERENCE TO RELATED APPLICATIONS

This application is a continuation of application Ser. No. 17/496,041, filed on Oct. 7, 2021, now allowed, which is a continuation of application Ser. No. 17/019,861, filed on Sep. 14, 2020, now U.S. Pat. No. 11,164,389, issued on Nov. 2, 2021, which is a continuation of application Ser. No. 16/057,890, filed on Aug. 8, 2018, now U.S. Pat. No. 10,803,667, issued on Oct. 13, 2020, and claims benefit of U.S. Provisional Application No. 62/544,084, filed on Aug. 11, 2017. The disclosures of the prior applications are incorporated by reference in their entirety.

TECHNICAL FIELD

This disclosure application relates generally to monitoring systems, and more particularly, to visualization in monitoring systems.

BACKGROUND

A monitoring system for a property can include various components including sensors, cameras, and other devices. A user can configure the monitoring system by placing components and defining monitoring rules in certain locations of the property to improve home security.

SUMMARY

Techniques are described for enhancing monitoring technology with augmented reality. For example, techniques are described for processes using an augmented reality device for creating, editing, and viewing of video analytics rules, configurations, and results. The configurations may include information about components such cameras, sensors, and augmented reality device as well as analytics software of a monitoring system. The rules may include information related to determination of an event such as definition of a monitoring area. The results may include events that are detected based on the configurations and rules and that may be recorded as any combination of an audio, image, video, or descriptive information.

In some implementations, an augmented reality device may display an event that has been detected by a monitoring system in an area in a property corresponding to a present field of view of the augmented reality device.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 3 illustrates an example process for displaying an event or a configuration of a monitoring system via an augmented reality device.

FIG. 4 illustrates an example process for updating a configuration of a monitoring system via an augmented reality device.

FIG. 6 illustrates an example process for displaying a prior event via an augmented reality device.

Like reference symbols in the various drawings indicate like elements.

DETAILED DESCRIPTION

Figure 1:
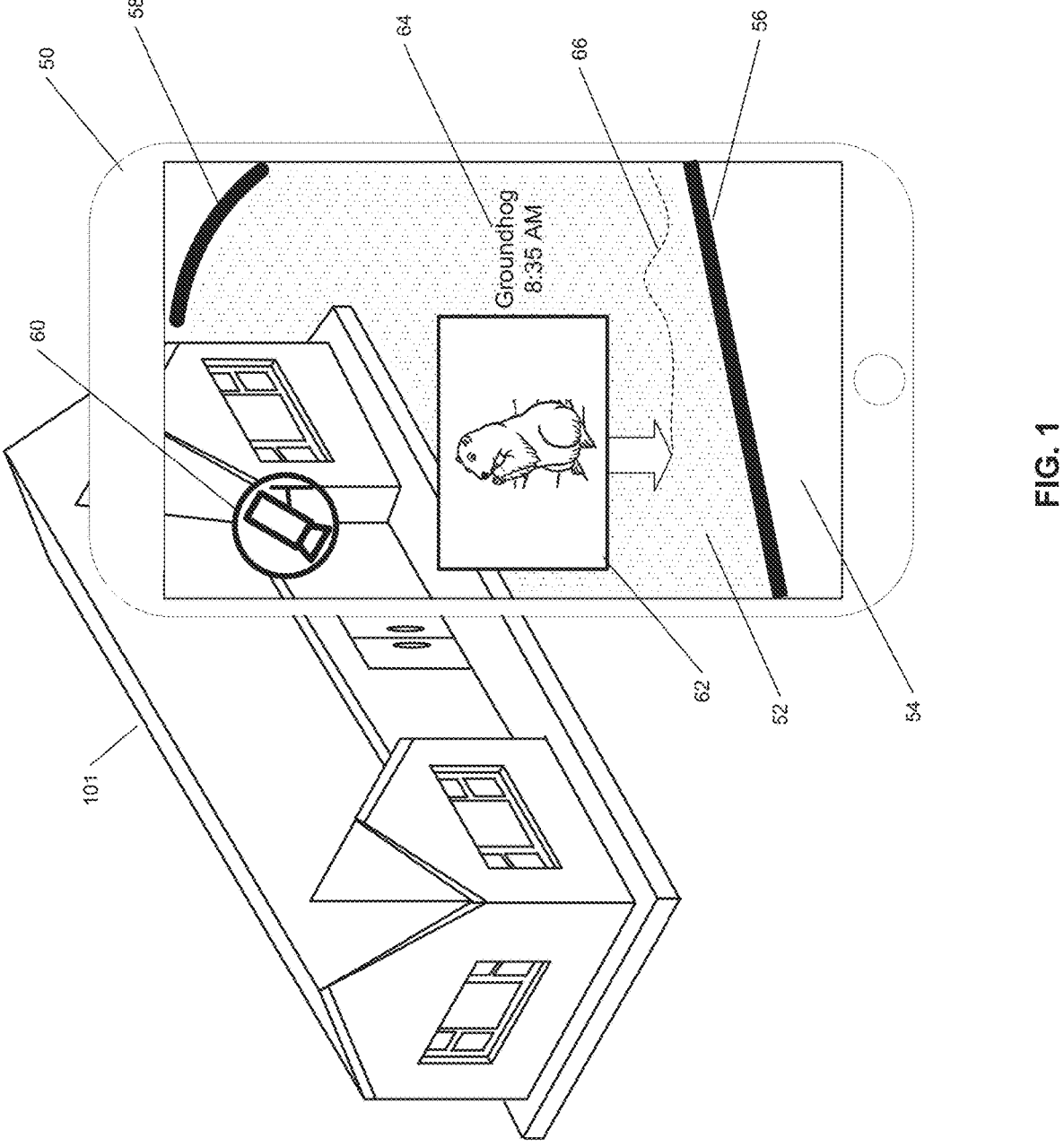
FIG. 1 illustrates an example of using an augmented reality device to view components of a monitoring system, monitoring rules, and an event recorded within a property.

Techniques are described for displaying information that corresponds to configurations, rules, and results of video analytics of a monitoring system on an augmented reality device. The augmented reality device can be a display interface (e.g., an optical head-mounted display, a mobile phone or tablet, an on-screen display, and etc.) that displays information overlaid onto an image/video stream that the augmented reality device presently captures. The augmented reality device may display live and/or recorded images/videos, textural information, and graphical visualizations.

In some examples, the augmented reality device may be a type of electro-optical (EO) device that can capture and display an image and/or video. For example, the augmented reality device may include an EO camera and a display, and be augmented with other assisted sensors, such as inertial measurement unit (IMU) such as compasses, gyroscopes, and accelerometers, optical flow cameras, infrared (IR) cameras, depth sensors, other 3D scanning devices, radio telemetry, GPS, and RFID, etc. which may help to sense the environment or to determine more accurate position of the augmented reality device.

The configurations of video analytics for a monitoring system may include information about components and video analytics software. For instance, the configuration may include calibration parameters such as locations of cameras, resolutions of the cameras, focal lengths of the cameras, fields of view of the cameras, and other parameters of the cameras. The augmented reality device may assist in setting the calibration parameters which may be utilized to map the fields of view of the cameras to the real world. In some examples, the configurations may also include information about a video analytics software engine that may analyze videos and detect motions based on pixel changes in captured images, for instance. The configurations of the video analytics software engine may include a provider name of the software engine and a version of the software engine.

The rules of video analytics may include, for example, polygons defining monitoring areas and virtual lines that are prohibited to cross in the monitoring areas. In some cases, the configurations may include the defined rules. The results of video analytics may be detected events by analyzing captured images and videos based on the configurations and rules of video analytics. For example, the results may be recorded as a video showing a moving object detected in the monitoring area defined by the rules. The results may include descriptive information such as time stamps of the events and locations of the events.

The augmented reality device can visualize monitoring zones or areas of interest defined within a monitored property while a user tours the areas of the property viewing the area through the augmented reality device. The augmented reality device can be used to assist the user in configuring a component during an installation, a maintenance operation, or a calibration. In an example, the user may use the augmented reality device to view visualizations that include information related to a field of view of a surveillance camera. The visualizations may be displayed through the augmented reality device in relation to the present field of view of the surveillance camera. In some examples, the augmented reality device may be used to determine appropriate installation locations and orientations of components of a monitoring system to have a satisfactory monitoring area.

The techniques described may enable the user to easily configure a monitoring system through a much richer and intuitive interaction utilizing the augmented reality device and calibrated cameras. For instance, the monitoring system may have calibration information corresponding to a location, a pose or orientation, and a field of view of each camera relative to a reference such as a flat ground, a wall, a fixture, or a 3D model of the monitored area. Based on information from the calibrated cameras and the augmented reality device, the monitoring system may determine an area that the augmented reality device currently views. The augmented reality device may display live and/or recorded video data and video analytics rules that correspond to the determined area.

FIG. 1 illustrates an example of using an augmented reality device 50 to view a recorded event, rules, and configurations of video analytics of a monitoring system at a property 101. The monitoring system may obtain data from cameras and sensors installed at the property 101. The monitoring system analyzes the obtained data based on various configurations and rules such locations/orientations of the cameras and sensors, a monitoring area of the property 101, virtual tripwires, and event triggering rules, etc. The monitoring system may identify an area of the property 101 that the augmented reality device 50 presently views based on the analyzed data from the cameras/sensors and image data from the augmented reality device 50. The augmented reality device 50 may be configured to visualize the various configurations and rules and display images/videos of the recorded event that is associated with the identified area of the property 101.

In the example depicted in FIG. 1, the augmented reality device 50 may be used to visualize one or more monitoring zones 52, 54 of a monitoring system (e.g., a home security system) at the property 101. For instance, the monitoring zone 52 may represent an area that is closer to the property 101 than the monitoring zone 54. The augmented reality device 50 may visualize the monitoring zones 52, 54 with different shades, patterns, or colors. When a user of the augmented reality device 50 changes an orientation or a location of the augmented reality device 50, the augmented reality device 50 displays updated views of the monitoring zones 52, 54 that correspond to the changes of the orientation or location of the augmented reality device 50. For example, the user may walk around the property 101 viewing the property 101 through the augmented reality device 50 to check overall monitoring zones that are overlaid onto the live image/video on the augmented reality device 50.

The monitoring system may include rules associated with the monitoring zones 52, 54. For instance, the rules may include recording options, tracking options, and alert options, etc. associated with the monitoring zones 52, 54. As an example, the rules may be set to record videos for an event that occurs in the monitoring zone 52, but ignore events that occur in the monitoring zone 54. In some cases, the rules may include the options that are applied depending on the events in the monitoring zones 52, 54. For instance, the rules may be set to alert the user or report to the authorities if a moving object detected in the monitoring zone 52 is an unknown human. But if the moving object detected in the monitoring zone 52 is a small animal, the rules may be set to record a video and track the moving object without an alert.

In some examples, the monitoring zones 52, 54 may vary depending on other conditions such as a time of a day and an arming status of the property 101. For example, the monitoring zone 52 may extend farther from the property 101 at nights to monitor a wider area. In another example, when motion sensors are disarmed inside the property 101, the monitoring zone 52 may be set to extend to cover a wider outside area. Although FIG. 1 illustrates two monitoring zones 52, 54 for brevity, actual implementations may include one or other plurality of monitoring zones as necessary, for example, according to a distance from the property 101 or an area of the property 101 (e.g., a front door, a back yard, an inside, sides, a garage, etc.).

In some implementations, as depicted in FIG. 1, the augmented reality device 50 may be configured to visualize one or more virtual tripwires 56, 58 of the monitoring system at the property 101. For instance, the virtual tripwires 56, 58 may be defined and visualized as a line, an arc, a curve, and other shapes, and a user may set a rule for each of the virtual tripwires 56, 58 for video analytics of the monitoring system. As an example, the user may define a virtual tripwire 56 as a line across a portion of the front yard area of the property 101. The user may set a rule associated with the virtual tripwire 56 to alert the user and to make a noise if the monitoring system detects a human crossing the virtual tripwire 56 after 9 P.M., for instance. The virtual tripwires 56, 58 may be visualized on the augmented reality device 50 in various colors, patterns, and shades that may represent different rules from each other.

The defined rules for video analytics may be tested while viewing through the augmented reality device 50. For instance, the user may attempt to intentionally trip the virtual tripwires either by walking across the area where the virtual tripwires are defined or by touching the virtual tripwires on the augmented reality device 50 with a finger to test whether a rule violation is detected by the monitoring system. The monitoring system may generate a test alert that verifies for the user that the rule works as intended. Based on the test result, the user may further edit the rules or create another rule. In some cases, the monitoring system may detect the user and determine that the user is an authorized user with the augmented reality device 50 to allow the user to create, edit, or test the rules without causing a real alarm.

When the user creates, edits, or tests the rules, the monitoring system may be left armed while allowing the user with the augmented reality device 50 to interact with the monitoring system. This feature may be useful for a larger property, for example, in installation or calibration of components in a portion of the larger property since the user may create, edit, and test the rules without disarming the entire monitoring system.

In examples where the monitoring system includes cameras and sensors that are installed at the property 101 and that are capable of tracking positions of the user carrying the augmented reality device 50 throughout the property 101 (e.g., outside areas, inside areas), the cameras can be used to recognize gestures and poses of the user. Based on the user's gestures, postures, or positions, the augmented reality device 50 may assist in gestural control of the monitoring system and interactions with the monitoring system.

For example, the user may "draw" rules such as a virtual tripwire and a monitoring zone by walking from one point to another point in the property 101 or by making a gesture such as moving a finger from one point to another point. Alternatively, or in addition, the user can draw the rules on the augmented reality device 50 (e.g., a tablet). The user may review the rules from a different perspective through the augmented reality device 50, which may help the user to more accurately place the rules than using a 2D interface.

The augmented reality device 50 may visualize the drawn virtual tripwire for the user to confirm that the tripwire is properly recognized by the cameras and set as intended in the monitoring system. In some examples, the user may modify the rule geometries such as monitoring zones and virtual tripwires by dragging, pinching, or widening the rule geometries visualized on the augmented reality device 50. In some cases, the user may modify the rule geometries by making a gesture such as waving a hand in a monitored area to remove the rule geometries defined in the monitored area, for instance.

The augmented reality device 50 may visualize connected components such as cameras and sensors installed at an area of the property 101 when the augmented reality device 50 views the area. For instance, the visualizations may include graphical icons overlaid on a field of view of the augmented reality device 50, where the icons represent positions of the components in the field of view of the augmented reality device 50. As depicted in FIG. 1, the augmented reality device 50 visualizes a camera 60 installed at a side wall of the property 101 as an icon representing the camera, for instance. In some cases, the visualizations may be a shape such as a circle around the camera in the present view instead of showing the icon representing the camera.

In examples where the cameras or sensors are installed in a hidden area or have a small form factor, the visualizations with blown-up icons can help the user to easily recognize the locations of the cameras and sensors in the augmented reality device 50. In some examples, the augmented reality device 50 may be capable of controlling the connected components. For instance, the user may be able to determine an activation status of the camera 60 based on the visualization (e.g., a green/red color of the circle around the camera icon) and turn on or off the camera 60 by selecting the visualization through the augmented reality device 50. The user may adjust pan and tilt angles of the camera 60 by dragging the camera icon or by selecting a submenu item that may be provided when the user clicks or touches the camera icon. In some examples, the user may adjust pan and tilt angles of the camera 60 to center the field of view of the camera 60 to a point that the user stands on or points at by tapping on a point in the augmented reality device 50.

The augmented reality device 50 may visualize data associated with a recorded or live event and display an image/video captured during the event. The data visualized may represent textural information associated with the event and geometrical information associated with the event. In some implementations, the visualizations may include various graphical, textual, audio, and video information to represent configurations, rules, and events. In some examples, the visualizations may include lines or curves corresponding to a path taken by a moving object which has been recorded as an event in the monitoring area. In other instances, the visualizations may include overlaid text that represent information associated with the event such as a time of the event and a kind of the moving object. The visualization may be a pop-up window, an arrow, or a box around an image displayed on the augmented reality device.

For example, as depicted in FIG. 1, when the augmented reality device 50 views the front yard area of the property 101, the augmented reality device 50 displays visualizations 62, 64, and 66 that represent an event in which a groundhog is inside the front yard area in the monitoring zone 52 taking a path at 8:35 AM. The visualization 62 is an image of the groundhog or a shape that indicates the event and a location (e.g., an end point) of the event. The visualization 64 shows textural information that includes identification of the detected object and the time stamp when the object was detected. The visualization 66 is a dotted line that represents the path that the groundhog took.

In some examples, the visualizations may be associated with additional data such as recorded video or still images of the event and a list of similar events. For instance, when the user selects the visualization 62 by clicking or touching the image of the groundhog, the recorded video of the event may be displayed on the augmented reality device 50 and overlaid on the area that the augmented reality device 50 presently views so that the user may think as the event presently occurs at the area. The monitoring system may provide guidance to lead the user to the location of an event when the location is not visible in the augmented reality device 50. For example, when the user selects an event from a list of events which occurred on the other side of the property 101, the augmented reality device 50 may display visualizations such as icons showing the user which direction the event location is in, which way to turn, which direction or path to take to get to the location, or how far away the event location is from the user.

In some implementations, the augmented reality device 50 may assist in calibrating new cameras and sensors that are installed at the property 101. For example, after a user has installed new cameras to monitor an area of the property 101, the user may view the area through the augmented reality device 50 to determine that data displayed on the augmented reality device 50 corresponds to the area that the new cameras are intended to monitor. Based on the data displayed on the augmented reality device 50, the user may further adjust or calibrate orientations or fields of view of the new and existing cameras. In other examples, the user may check whether a camera installed at the property 101 can detect the user by visualizing the field of view of the camera on the augmented reality device 50 or by playing the data that the camera presently captures on the augmented reality device 50.

In some implementations, the monitoring system with the augmented reality device 50 can be used to view one or more monitored areas overlaid to provide an interpolated view. For example, when the augmented reality device 50 is oriented to view the property 101 from an outside, the monitoring system may determine that the orientation of the augmented reality device 50 corresponds to an orientation of a camera installed inside the property 101. In response to determining that the orientation of the augmented reality device 50 corresponds to the orientation of the camera installed inside the property 101, the augmented reality device 50 may interpolate the outside view by the augmented reality device with the inside view by the camera installed inside to "look through" the wall or obstacles. In other examples, the user may use the augmented reality device 50 to "look through" the wall from inside of the property 101 to the outside. As the user changes the orientation of the augmented reality device 50, the monitoring system may render a corresponding view by interpolating/ stitching information received from the appropriate cameras.

In some implementations, the augmented reality device 50 may show real or interpolated views, or a synthetic representation of what is detected in the area. For example, if a camera or non-visual sensor (or combination thereof) detects an object on the other side of the wall, the augmented reality device 50 may display a symbolic or 3D represen- tation of the object which is rendered in order to show the location of the object to the user, even if an image or video of the object is not available. In examples where the camera on the other side of the wall has a different view from the perspective corresponding to the view of the augmented reality device 50, the monitoring system may generate a 3D representation of the scene and reorient it to the proper perspective to display on the augmented reality device 50. This representation may be rendered in a realistic fashion using captured color and texture the object or in a symbolic fashion using wireframes or icons.

Figure 2:
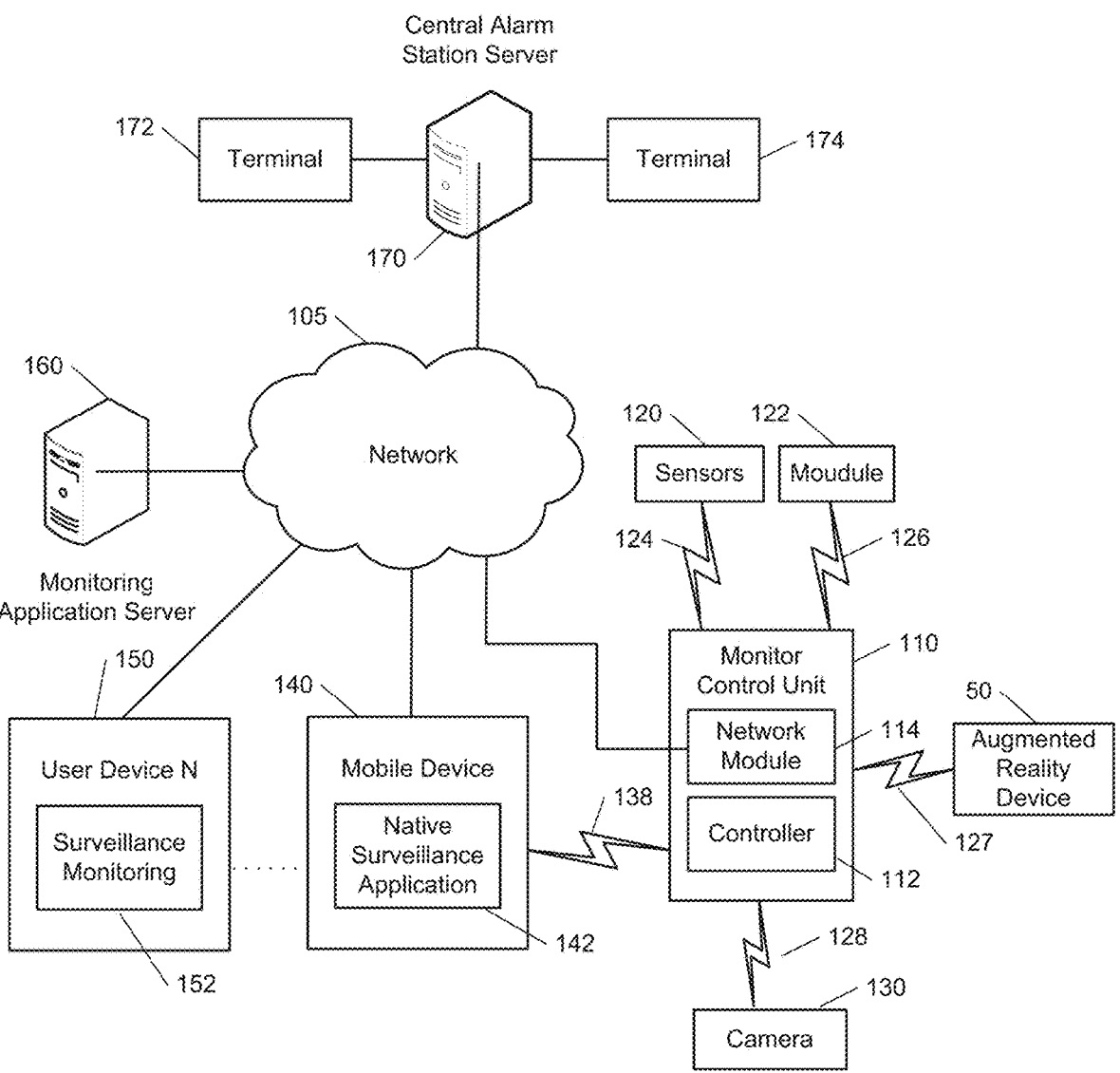
FIG. 2 illustrates an example of a system that is capable of monitoring with an augmented reality device.

FIG. 2 illustrates an example of a system 200 configured to provide surveillance, reporting, and monitoring with an augmented reality device 50. The system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communica- tions between the monitoring system control unit 110, the one or more user devices 140, 150, the monitoring applica- tion server 160, and the central alarm station server 170. The network 105 may include, for example, one or more of the Internet, Wide Area Networks (WANs), Local Area Net- works (LANs), analog or digital wired and wireless tele- phone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may include a circuit-switched network, a packet-switched data network, or any other network able to carry electronic communications (e.g., data or voice com- munications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice commu- nications. The network 105 may include one or more net- works that include wireless data channels and wireless voice channels. The network 105 may be a wireless network, a broadband network, or a combination of networks including a wireless network and a broadband network.

The monitoring system control unit 110 includes a con- troller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the con- troller 112 may be configured to receive input from sensors, detectors, or other devices included in the alarm system and control operations of devices included in the alarm system or other household devices (e.g., a thermostat, an appliance, lights, etc.). For example, the controller 112 may be con- figured to control operation of the network module 114 included in the monitoring system control unit 110.

The network module 114 is a communication device configured to exchange communications over the network 105. The network module 114 may be a wireless commu- nication module configured to exchange wireless commu- nications over the network 105. For example, the network module 114 may be a wireless communication device con- figured to exchange communications over a wireless data channel and a wireless voice channel. In this example, the network module 114 may transmit alarm data over a wireless data channel and establish a two-way voice communication session over a wireless voice channel. The wireless com- munication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired commu- nication module configured to exchange communications over the network 105 using a wired connection. For instance, the network module 114 may be a modem, a network interface card, or another type of network interface device. The network module 114 may be an Ethernet net- work card configured to enable the monitoring system control unit 110 to communicate over a local area network and/or the Internet. The network module 114 also may be a voiceband modem configured to enable the alarm panel to communicate over the telephone lines of Plain Old Tele- phone Systems (POTS).

The monitoring system that includes the monitoring sys- tem control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform sur- veillance or monitoring. The module 122 is connected to one or more lighting systems and is configured to control opera- tion of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring system control unit 110. The camera 130 may employ a small solar cell to recharge the battery when light is available. Alternatively, the camera 130 may be powered by the controller's 112 power supply if the camera 130 is co-located with the controller 112.

In some implementations, the system 200 may further include an augmented reality device 50 that a user of the property 101 may wear or carry to view the property 101 and to communicate with the system 200. In some examples, the augmented reality device 50 may include a communication module configured to send the image/video data to the system 200 (e.g., control unit 110, application server 160) and to receive information from the system 200. For example, the system 200 may be capable of image processing and video analytics of images/videos captured by the camera 130 and the augmented reality device 50 based on configurations and rules of video analytics as described in regard to FIG. 1. The analyzed data or recorded image/video may be transmitted to the augmented reality device 50 to be displayed overlaid on what the augmented reality device 50 presently views. The processing (e.g., image processing, video analytics) could take place on the augmented reality device 50, or be shared with networked computing resources located either locally at the property 101 (e.g., control unit 110) or remotely (e.g., servers 160, 170).

The sensors 120, the module 122, the camera 130, and the augmented reality device 50 communicate with the controller 112 over communication links 124, 126, 127, and 128. The communication links 124, 126, 127, and 128 may be a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 127 over which the augmented reality device 50 and the controller 112 communicate may include a local network. The augmented reality device 50 and the controller 112 may exchange images and commands over the local network. The local network may include 802.11 "WiFi" wireless Ethernet (e.g., using low-power WiFi chipsets), Z-Wave, Zigbee, Bluetooth, "Homeplug," other "Powerline" networks that operate over AC wiring, or wired Ethernet networks utilizing cables such as a Category 5 (CAT5) or Category 6 (CAT6).

The monitoring application server 160 provides monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 provides alarm monitoring service by exchanging communications with the monitoring system control unit 110, the one or more user devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more user devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc. In some implementations, the user device 140 may include an augmented reality device such as a head-mount display.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as WiFi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, all of the processing described throughout this disclosure may be implemented in a monitoring system control panel located inside the property being monitored, as opposed to sending data to an external server for processing. For example, rather than being a separate server located in a remote location, the monitoring application server 160 may be a logical component inside of the monitoring system control unit 110. In this example, the monitoring system control unit 110 performs the processing of supervising property access without having to send image/video data to a separate server separated by a network.

In other implementations, all of the processing described throughout this disclosure may be performed on a remote server (e.g., monitoring application server 160). In these implementations, the monitoring system control panel (or sensors themselves) may send image/video data to the remote server over a network and the remote server may perform all of supervising property access. For instance, the monitoring system control unit 110 sends all captured image/video data to the monitoring application server 160 and the monitoring application server 160 performs the processing of supervising property access.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 2, the processing described throughout this disclosure may be mixed between the monitoring system control unit 110 and the monitoring application server 160.

FIG. 3 illustrates an example of a process 300 for generating visualizations of an event or a configuration of a monitoring system on an augmented reality device. Briefly, the process 300 may include obtaining an image of an area of a property from an augmented reality device (310), identifying the area of the property based on the image obtained from the augmented reality device (320), determining that the area corresponds to an event or a configuration of a monitoring system of the property (330), and in response to determining that the area corresponds to the event or the configuration, providing information that represents the event or the configuration and that is configured to be displayed on the augmented reality device (340).

In more detail, the process 300 may include obtaining an image of an area of a property from an augmented reality device 50 (310). For instance, the application server 160 (see FIG. 2) may obtain an image or video of an area of a property within a current field of the augmented reality device 50 such as a portion of the front yard in FIG. 1 of the property 101. As a user moves the augmented reality device 50 or changes orientation of the augmented reality device 50, the application server 160 receives updated images corresponding to an area of the property 101 where the augmented reality device 50 is oriented.

The process 300 may include identifying the area of the property based on the image obtained from the augmented reality device 50 (320). For instance, the application server 160 may obtain reference images corresponding to portions of the property 101. The reference images may be captured by cameras 130 and/or have been captured by the augmented reality device 50. The application server 160 may store the reference images for the portions of the property 101. The application server 160 then may compare the image obtained from the augmented reality device 50 with the reference images. The comparison may produce a plurality of results that indicate whether the image obtained from the augmented reality device 50 matches the reference images. In some implementations, the application server 160 may utilize a neural network to identify the area of the property 101 based on the image, for example, by processing the image through a neural network trained to classify objects and areas in the image.

The application server 160, based on comparison results, may identify a portion of the property 101 that corresponds to the area in the image obtained from the augmented reality device 50. For example, the application server 160 may determine that the area of the property 101 included in the image corresponds to a portion of the property 101 among the portions of the property included in the reference images.

Alternatively or in addition, in examples where the application server 160 is capable of determining a location of the augmented reality device 50 in the property 101, the application server 160, utilizing location information of the augmented reality device 50, may determine a point of view of the image obtained from the augmented reality device 50. For example, the application server 160 may obtain reference images that include coordinates of portions of the property 101. In some examples, the application server 160 may have generated, based on the reference images, a three dimensional (3D) map of the property 101 using 3D mapping techniques. For instance, the reference images may, respectively, be associated to coordinates at the property 101 relative to a reference frame defined in the 3D map. The 3D map of the property 101 may be generated using reference images captured by calibrated cameras and location information of the cameras including sensors (e.g., GPS sensor).

In some examples, the application server 160 may receive, from the augmented reality device 50, a signal that indicates a location and an orientation of the augmented reality device at the property. For example, the augmented reality device 50 may utilize a visual inertial odometry (VIO) technology to determine its pose, orientation, or location based on a combination of its accelerometer/gyro data and visual feature tracking. In some examples, the signal may correspond to images from the augmented reality device 50 for VIO analysis, an output from an accelerometer or gyroscope of the augmented reality device 50, or a GPS signal from the augmented reality device 50. The augmented reality device 50 may provide the application server 160 with the signal that indicates the pose, orientation, or location of the augmented reality device 50. For instance, when the augmented reality device 50 are located at an outdoor area, a GPS signal may be used to estimate its global position. The application server 160 may receive the GPS signal from the augmented reality device 50 to identify the area of the property 101.

In some examples, the application server 160 may, based on reception of the signal, determine that the location and the orientation of the augmented reality device corresponds to a coordinate among the coordinates of portions of the property. A coordinate may be expressed using a plurality of orthogonal axes such as two horizontal axes (e.g., x-axis and y-axis) and one vertical axis (z-axis) or a plurality of angles and a distance from an origin defined in the 3D map of the property 101. The application server 160 may determine a coordinate of the augmented reality device 50 based on the signal received from the augmented reality device 50, and compare the determined coordinate to a plurality of coordinates corresponding to portions of the property 101. Based on the comparison, the application server 160 may determine that the area included in the image corresponds to a portion of the property 101 corresponding to the coordinate among the plurality of coordinates of portions of the property 101.

In some examples, the application server 160 may convert the coordinate of the augmented reality device 50 to a different coordinate relative to the 3D map of the property 101. For instance, the application server 160 may convert a global or absolute coordinate of the augmented reality device 50 to a local or relative coordinate with respect to a reference frame of the 3D map. Based on the converted coordinate, the application server 160 may determine a portion of the property 101 corresponding to the image obtained from the augmented reality device 50. For instance, the application server 160 may determine that the image corresponds to a portion of the property 101 defined by coordinates $(Xi, Yi, Zi)$ with respect to the reference frame of the 3D map of the property 101. The term i may correspond to a point in the 3D map.

In some examples, identifying the area of the property based on the image obtained by the augmented reality device 50 may include an additional step of performing visual registration between the image obtained by the augmented reality device 50 and the reference image, which can be assisted by calibration data if available. For example, the calibration data may include coordinates of the reference image, and the location/pose data from GPS/gyro sensors of the augmented reality device 50 may be compared to the coordinates of the reference image to identify the area of the property that the augmented reality device 50 views.

The process 300 may include determining that the area corresponds to an event or a configuration of a monitoring system (330). For instance, the application server 160 may determine the corresponding events or configurations based on attributes such as coordinates or location information, an area, and a time associated with the events or the configurations. In some examples, the application server 160 may obtain a list of prior events that includes location attributes related to event locations associated with the prior events, respectively. The list of prior events may have been determined based on images captured during the prior events. The images may be captured by the cameras 130 or the augmented reality device 50. The application server 160, based on reception of the images captured during the prior events, may have analyzed and associated the images with attributes related to event locations, respectively, and stored the attributes in a database to facilitate retrieve of a list of the prior events using the attributes as indexes to search the database.

Using the image obtained from the augmented reality device 50, the application server 160 may determine that the area of the property 101 included in the image corresponds to one or more prior events occurred at event locations in the area. For example, when the application server 160, as described in step (320), determines the area in the image corresponds to a portion of the front yard of the property 101, the application server 160 may retrieve a list of prior events that were detected in the portion of the front yard in a certain time frame (e.g. 24 hrs., 1 week, 1 month, etc.) based on the area and time attributes of the prior events. In examples where a 3D map of the monitoring area is established, the events and the configurations may be stored in a database that includes various indexes such as the coordinates of events and configurations with respect to a reference frame of the 3D map. Using the various indexes, the application server 160 may determine that the area of the property 101 included in the image corresponds to one or more prior events occurred at the event locations in the area.

The application server 160 may provide information that represents the one or more prior events occurred at the event locations. For example, as the augmented reality device 50 moves in an area of the property 101, the application server 160 may determine the coordinates of the augmented reality device 50 in the 3D map, and retrieve corresponding events/ configurations from the database. Then the application server 160 may provide the retrieved events/configurations to the augmented reality device 50 to render corresponding visualizations.

The process 300 may include in response to determining that the area corresponds to the event or the configuration, providing information representing the event or the configuration for display on the augmented reality device 50 (340). For instance, the application server 160 may provide information to the augmented reality device 50, which then generates visualizations representing the determined event or configuration for display in the field of view of the augmented reality device 50. The augmented reality device 50 may display the generated visualizations through a display device of the augmented reality device 50. The augmented reality device 50 may display a visualization such as an icon or a pop-up window indicating the events so that the user can select to view an image/video associated with the events.

In some implementations, the application server 160 may determine whether the event or the configuration corresponds to a portion of the property that is outside of a present view of the augmented reality device. For instance, while the augmented reality device 50 is presently viewing a front yard from an outside of the property 101 (see FIG. 1), the application server 160 may find an event occurred in an inside area (e.g. kitchen) of the property 101 or a virtual tripwire defined in the inside area. As the inside area is not visible from the outside of the property 101 through the augmented reality device 50, the application server 160 may determine a graphical representation of the portion of the property such as images of the inside area that have been captured or graphics that have been synthesized to a similar shape as the inside area. Then, the application server 160 may provide screen information to the augmented reality device 50 to display the graphical representation of the portion of the property and the information that represents the event or the configuration. The displayed information is overlaid on the graphical representation of the portion of the property. In this example, the application server 160 enables the user to "look through" a wall of the property 101 by displaying the event or the configuration on the graphical representation of the inside of the property 101 using the augmented reality device 50.

In some implementations, the process 300 includes displaying the information that represents the event or the configuration on the augmented reality device in which the displayed information is overlaid on a present view of the augmented reality device. For instance, the augmented reality device 50 may receive the information from the monitoring application server 160 via the network 105 or the control unit 110. In some implementations, the control unit 110 may be installed at the property 101. In some implementations, the control unit 110 may be remote (e.g., a cloud server) from the property 101. In some implementations, or the application server 160 may provide the services described with respect to the control unit 110 in this application.

The augmented reality device 50 may, based on reception of the information from the application server 160, display a visualization of an object detected during the event at the area of the property or a visualization of the configuration of the monitoring system. For instance, the visualization of the object may include at least one of an image of the object captured during the event, a video recorded during the event, one or more frames of the video (e.g., still images), a path taken by the object, or a graphical object or text that indicates occurrence of the event or an identification of the object. The visualization of the configuration may represent at least one of monitoring zones of the property, a virtual tripwire that indicates a detection boundary of the monitoring system, or a component of the monitoring system installed at the property.

FIG. 4 illustrates an example process for updating a configuration of a monitoring system via an augmented reality device. Briefly, a process 400 includes displaying the information that represents the event or the configuration on the augmented reality device in which the displayed information is overlaid on a present view of the augmented reality device (410), receiving, through the augmented reality device, an input that indicates modification of at least one of the monitoring zones, the virtual tripwire, or the component of the monitoring system (420), updating the configuration of the monitoring system based on the input (430), and displaying the information that represents the updated configuration and that is overlaid on the present view of the augmented reality device (440).

In some implementations, as described above, the application server 160 may provide the augmented reality device 50 with screen information that includes a visualization of the configuration of the monitoring system. For instance, the visualization of the configuration represents at least one of monitoring zones 52, 54 of the property 101, virtual tripwires 56, 58 that indicate a detection boundary of the monitoring system, or a component (e.g., a camera 60) of the monitoring system installed at the property 101. Based on the screen information, the augmented reality device 50 may display the information that represents the event or the configuration in which the displayed information is overlaid on a present view of the augmented reality device 50 (410). For example, the augmented reality device 50 may display, on a display portion of the augmented reality device 50, one or more visualizations of the configuration of the monitoring system of the property 101.

In some implementations, the application server 160 may receive, through the augmented reality device 50, an input that indicates modification of at least one of the monitoring zones, the virtual tripwire, or the component of the monitoring system (420). For instance, the augmented reality device 50 may include an input device configured to detect motion or touch on the input device, an imaging device configured to detect a gestural input of the user, or a sound sensor configured to receive a voice input from the user. The application server 160 may receive a signal from the augmented reality device 50 corresponding to the input received at the input device.

In some implementations, the application server 160 may update the configuration of the monitoring system based on the input (430). For example, the application server 160, based on the input from the augmented reality device 50, may define a monitoring zone or virtual tripwire, remove an existing monitoring zone or virtual tripwire, or move an existing monitoring zone or virtual tripwire from a first point to a second point on the augmented reality device 50. In some examples, the application server 160 may change a configuration of the camera 60 such as an orientation, a frame rate, a focal length, etc. of the camera 60 based on the input through the augmented reality device 50. In some cases, the application server 160 may include a plurality of predefined configurations, and allow a user to select a configuration among the plurality of predefined configurations through the augmented reality device 50. The predefined configuration may include one or more of monitoring zones, virtual tripwires, or settings of various components of the monitoring system.

The application server 160 then may provide screen information to the augmented reality device 50 to display the information that represents the updated configuration and that is overlaid on the present view of the augmented reality device 50 (440). For instance, the updated information may include the monitoring zones 52, 54 widened to monitor a larger area, the virtual tripwires 56, 58 moved to new locations, or the field of view of the camera 60 oriented to a new direction. These updated information may be overlaid on the present view of the augmented reality device 50.

Figure 5:
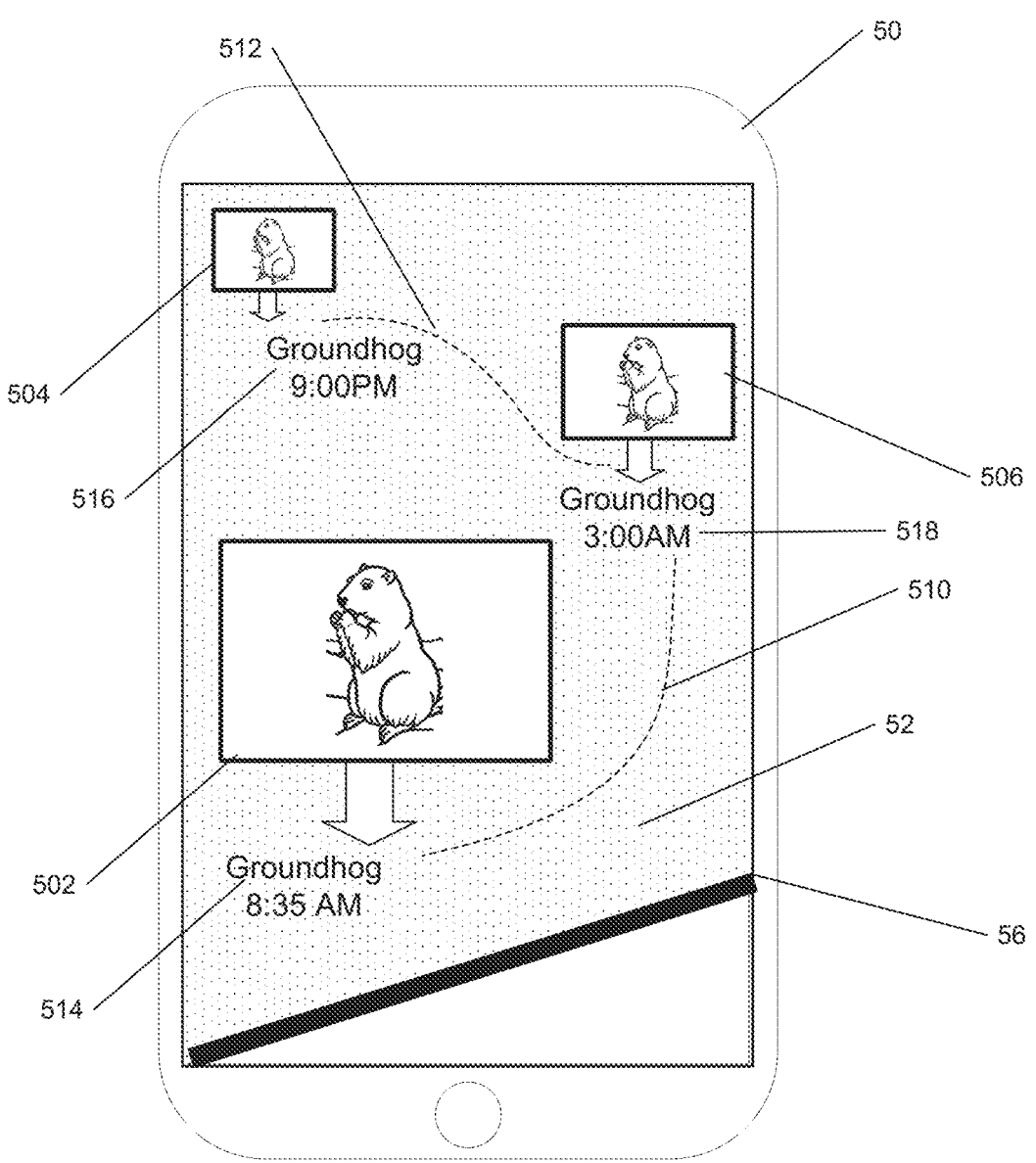
FIG. 5 illustrates an example of using an augmented reality device to view multiple events occurred at a monitored property.

FIG. 5 illustrates an example of using an augmented reality device to view multiple events occurred a monitored property. For example, the augmented reality device 50 presently views an area of a property, and displays, on the present view of the area, various visualizations such as a monitoring zone 52, a virtual tripwire 56, images 502, 504, and 506, paths 510 and 512 between the images, and multiple text 514, 516, and 518. The images 502, 504, and 506 indicate prior events that correspond to detections of a ground hog at event locations in the monitoring zone 52. The paths 510 and 512 between the images indicate paths that the groundhog took to move from one event location to another event location detected during the prior events. The text 514, 516, and 518 indicate a type of the detected object (e.g., groundhog) and event times corresponding to the detections of the object. In some cases, the paths 510 and 512 may represent paths estimated based on the event locations and event times.

In some implementations, the prior events may include detection of various other types of objects such as a visitor, a homeowner, an animal, a potential intruder, etc. The prior events may occur outside of the present view of the augmented reality device 50. For instance, the augmented reality device 50 is not capable of viewing through a wall to view a prior event may have occurred at an area behind the wall of the property. In some examples, the augmented reality device 50 may generate a graphical representation of the area behind the wall of the property, and display the prior event on the graphical representation. The images 502, 504, and 506 may be linked to a video or other images captured during the prior events, and be available to display on the augmented reality device 50 based on a user input.

FIG. 6 illustrates an example process for displaying a prior event via an augmented reality device. Briefly, an example process 600 includes obtaining a list of prior events that includes type attributes related to event types associated with the prior events, respectively (610), determining a type of the event corresponding to the image of the area of the property (620), determining, from the list of prior events, one or more prior events that include the type attributes corresponding to the determined type of the event (630), and displaying, on the augmented reality device, information that represents the one or more prior events and the event corresponding to the image of the area of the property in which the displayed information is overlaid on a present view of the augmented reality device (640). The process 600 may further include determining whether the one or more prior events corresponds to event locations within a present view of the augmented reality device (650), and based on a determination that the one or more prior events do not correspond to the event locations within the present view of the augmented reality device, providing guidance to one or more locations corresponding to the one or more prior events (660).

In some implementations, the application server 160 may obtain a list of prior events that includes type attributes related to event types associated with the prior events, respectively (610). In some examples, the application server 160 may determine the type attributes of the prior events based on video analytics of images captured during the prior events. For example, the type attributes may include types of the objects detected (e.g., a human, an animal, etc.), identifications of the objects (e.g., a visitor, a homeowner, a dog, a cat, etc.), known activities (e.g., scheduled service or delivery) at the property, or potential security breaches. The application server 160 may include a predetermined time frame corresponding to the list of prior events. For instance, the application server 160 is preset to retrieve a list of prior events for the last twenty four hours.

Using a similar process as 610, the application server 160 may determine a type of the event corresponding to the image of the area of the property obtained from the augmented reality device 50 (620). For example, the application server 160 may determine a location of the area that the augmented reality device is presently viewing, and determine a latest event or a predetermined type of event occurred on the location. Based on a type attribute of the latest event, the application server 160 may determine the type of the event corresponding to the image obtained from the augmented reality device 50. If the event is concurrently occurring at the location while the augmented reality device 50 is presently viewing, the application server 160 may analyze the image, determine a type attribute, and associate the type attribute with the image.

The application server 160 then determine, from the list of prior events, one or more prior events that include the type attributes corresponding to the determined type of the event (630). For example, the application server 160 may search a database, which stores various prior events and attributes associated with the prior events, to determine one or more prior events that have the same or similar type attributes. In the example shown FIG. 1, the image shown in the augmented reality device 50 may be associated with a type attribute, for example, "animal" or "groundhog." The application server 160 may search the databased to determine one or more prior events that have the type attribute "animal" or "groundhog" and that occurred within a predetermined time window. The prior events may have occurred at multiple locations around the property 101. The multiple locations may or may not be in the present view of the augmented reality device 50. In some examples, the application server 160 may include a search filter that excludes the prior events occurred outside of a predetermined range from the present view of the augmented reality device 50.

The application server 160 may provide screen information to display, on the augmented reality device, information that represents the one or more prior events and the event corresponding to the image of the area of the property in which the displayed information is overlaid on a present view of the augmented reality device (640). The augmented reality device 50 may display multiple visualizations corresponding to the one or more prior events within the predetermined time window, which may include the event corresponding to the image obtained from the augmented reality device 50. As discussed above, the visualizations may include a still image, a graphical object, text, etc., and they may be displayed at different areas in the augmented reality device 50 corresponding to their event locations. In some cases, the visualizations may include a table or a window that lists the prior events having common type attributes.

The application server 160 may provide additional information regarding the one or more prior events. For example, the application server 160 may provide a video associated with one of the prior events based on an input (e.g., touch input) on the augmented reality device 50. Then the augmented reality device 50 may play the video, which is overlaid on the present view of the augmented reality device 50. In some examples, the application server 160 may provide various information such as an occurrence time, a path taken by a detected object in the prior event, and an identification of the object.

In some implementations, the application server 160 may determine whether the one or more prior events correspond to event locations within a present view of the augmented reality device (650). As discussed above, the prior events may include an event that occurred in an area that is not in the present view of the augmented reality device 50. In some examples, the application server 160 may determine, using location attributes of the prior events, event locations of the one or more prior events. For example, one of the prior events may be associated with a location attribute "backyard," while the augmented reality device 50 is presently viewing a front yard area. In some examples, the application server 160 may determine, based on the location attributes, that the prior event does not correspond to an event location within a present view of the augmented reality device 50.

In some examples, the application server 160 may determine, based on the image obtained from the augmented reality device 50, whether the prior event corresponds to an event location within a present view of the augmented reality device 50. For instance, if the image does not include an area corresponding to the event location, the application server 160 may determine that the prior event does not correspond to an event location within a present view of the augmented reality device 50.

In some implementations, the application server 160 may provide guidance to one or more locations corresponding to the one or more prior events based on a determination that the one or more prior events do not correspond to the event locations within the present view of the augmented reality device (660). For instance, the application server 160 may provide the augmented reality device 50 with screen information to display a route from a current location of the augmented reality device 50 to the one or more locations corresponding to the one or more prior events, respectively. In the previous example where the prior event is associated with a location attribute "backyard" while the augmented reality device 50 is presently viewing a front yard area, the application server 160 may provide a route from the current location at the front yard area to the event location at the backyard corresponding to the location attribute of the prior event.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:

maintaining, in a memory of an extended reality device, at least a portion of a three-dimensional model a) of a property and b) that includes a model of each of a plurality of components including a sensor of a monitoring system physically located at the property;

providing, on a display of the extended reality device and using the portion of the three-dimensional model of the property, a first representation representing a first portion of the property and the sensor;

receiving, by the extended reality device while the extended reality device displays the first representation using the three-dimensional model of the property and an input device of the extended reality device, an input that indicates a modification of a configuration of the sensor that is physically located within the first portion of the property and that is visualized in the first representation;

in response to receiving the input, transmitting, by the extended reality device and to the monitoring system, an instruction to update the configuration of the sensor of the monitoring system physically located at the property using data representing the input; and providing, on the display of the extended reality device, a second representation of the portion of the three-dimensional model of the property and the sensor using the three-dimensional model of the property that includes the model of the sensor that is physically located within the first portion of the property and a visualization of the updated configuration of the sensor of the monitoring system that represents the modification of the configuration of the sensor.

2. The method of claim 1, wherein transmitting an instruction to update the configuration of the sensor of the monitoring system physically located at the property using the data representing the input comprises:

transmitting data that indicates a modification to a configuration of at least one of a monitoring zone or virtual tripwire.

3. The method of claim 1, wherein transmitting an instruction to update the configuration of the sensor of the monitoring system physically located at the property using the data representing the input comprises:

transmitting data that indicates a modification to a configuration of a camera installed at the property and wherein the modification comprises a modification of at least one of orientation, frame rate, or focal length of the camera.

4. The method of claim 1, wherein transmitting an instruction to update the configuration of the sensor of the monitoring system physically located at the property using the data representing the input comprises:

transmitting data that represents the input received using the input device of the extended reality device.

5. The method of claim 1, wherein providing, on a display of the extended reality device, the first representation representing the first portion of the property and the sensor comprises:

providing a visualization of a set of predefined monitoring system configurations.

6. The method of claim 5, wherein receiving the input that indicates the modification of the configuration of the sensor that is physically located within the first portion of the property and that is visualized in the first representation comprises:

receiving data that indicates a predefined monitoring system configuration selected from among the set of predefined monitoring system configurations in the first representation representing the first portion of the property and the sensor, each predefined monitoring system configuration of the set of predefined monitoring system configurations having a different representation in the first representation.

7. The method of claim 1, wherein receiving, by the extended reality device while the extended reality device displays the first representation using the three-dimensional model of the property and the input device of the extended reality device, the input that indicates the modification of the configuration of the sensor comprises at least one of:

receiving motion input from a motion sensor of the input device;

receiving touch input from a touch sensor of the input device; or receiving voice input from an audio sensor of the input device.

8. The method of claim 1, wherein providing, on the display of the extended reality device, the first representation representing the first portion of the property and the sensor comprises:

displaying a visualization that includes one or more visualizations of monitoring zones at the property.

9. The method of claim 1, wherein providing, on a display of the extended reality device, the first representation representing the first portion of the property and the sensor comprises:

displaying a visualization that includes one or more visualizations of virtual tripwires at the property.

10. The method of claim 1, wherein providing, on a display of the extended reality device, the first representation representing the first portion of the property and the sensor comprises:

displaying a visualization that includes one or more visualizations of one or more cameras installed at the property.

11. A system comprising one or more computers and one or more storage devices on which are stored instructions that are operable, when executed by the one or more computers, to cause the one or more computers to perform operations comprising:

maintaining, in a memory of an extended reality device, at least a portion of a three-dimensional model a) of a property and b) that includes a model of each of a plurality of components including a sensor of a monitoring system physically located at the property;

providing, on a display of the extended reality device and using the portion of the three-dimensional model of the property, a first representation representing a first portion of the property and the sensor;

receiving, by the extended reality device while the extended reality device displays the first representation using the three-dimensional model of the property and an input device of the extended reality device, an input that indicates a modification of a configuration of the sensor that is physically located within the first portion of the property and that is visualized in the first representation;

in response to receiving the input, transmitting, by the extended reality device and to the monitoring system, an instruction to update the configuration of the sensor of the monitoring system physically located at the property using data representing the input; and providing, on the display of the extended reality device, a second representation of the portion of the three-dimensional model of the property and the sensor using the three-dimensional model of the property that includes the model of the sensor that is physically located within the first portion of the property and a visualization of the updated configuration of the sensor of the monitoring system that represents the modification of the configuration of the sensor.

12. The system of claim 11, wherein transmitting an instruction to update the configuration of the sensor of the monitoring system physically located at the property using the data representing the input comprises:

transmitting data that indicates a modification to a configuration of at least one of a monitoring zone or virtual tripwire.

13. The system of claim 11, wherein transmitting an instruction to update the configuration of the sensor of the monitoring system physically located at the property using the data representing the input comprises:

transmitting data that indicates a modification to a configuration of a camera installed at the property and wherein the modification comprises a modification of at least one of orientation, frame rate, or focal length of the camera.

14. The system of claim 11, wherein transmitting an instruction to update the configuration of the sensor of the monitoring system physically located at the property using the data representing the input comprises:

transmitting data that represents the input received using the input device of the extended reality device.

15. The system of claim 11, wherein providing, on a display of the extended reality device, the first representation representing the first portion of the property and the sensor comprises:

providing a visualization of a set of predefined monitoring system configurations.

16. The system of claim 15, wherein receiving the input that indicates the modification of the configuration that is physically located within the first portion of the property and that is visualized in the first representation comprises:

receiving data that indicates a predefined monitoring system configuration selected from among the set of predefined monitoring system configurations in the first representation representing the first portion of the property and the sensor, each predefined monitoring system configuration of the set of predefined monitoring system configurations having a different representation in the first representation.

17. The system of claim 11, wherein receiving, by the extended reality device while the extended reality device displays the first representation using the three-dimensional model of the property and the input device of the extended reality device, the input that indicates the modification of the configuration of the sensor comprises at least one of:

receiving motion input from a motion sensor of the input device;

receiving touch input from a touch sensor of the input device; or receiving voice input from an audio sensor of the input device.

18. The system of claim 11, wherein providing, on the display of the extended reality device, the first representation representing the first portion of the property and the sensor comprises:

displaying a visualization that includes one or more visualizations of monitoring zones at the property.

19. The system of claim 11, wherein providing, on a display of the extended reality device, the first representation representing the first portion of the property and the sensor comprises:

displaying a visualization that includes one or more visualizations of one or more cameras installed at the property.

20. One or more computer storage media encoded with instructions that, when executed by one or more computers, cause the one or more computers to perform operations comprising:

maintaining, in a memory of an extended reality device, at least a portion of a three-dimensional model a) of a property and b) that includes a model of each of a plurality of components including a sensor of a monitoring system physically located at the property;

providing, on a display of the extended reality device and using the portion of the three-dimensional model of the property, a first representation representing a first portion of the property and the sensor;

receiving, by the extended reality device while the extended reality device displays the first representation using the three-dimensional model of the property and an input device of the extended reality device, an input that indicates a modification of a configuration of the sensor that is physically located within the first portion of the property and that is visualized in the first representation;

in response to receiving the input, transmitting, by the extended reality device and to the monitoring system, an instruction to update the configuration of the sensor of the monitoring system physically located at the property using data representing the input; and providing, on the display of the extended reality device, a second representation of the portion of the three-dimensional model of the property and the sensor using the three-dimensional model of the property that includes the model of the sensor that is physically located within the first portion of the property and a visualization of the updated configuration of the sensor of the monitoring system that represents the modification of the configuration of the sensor.

* * * * *